H. A. BARNARD.
Smut-Mills.
No. 5,795. Reissued March 17, 1874.
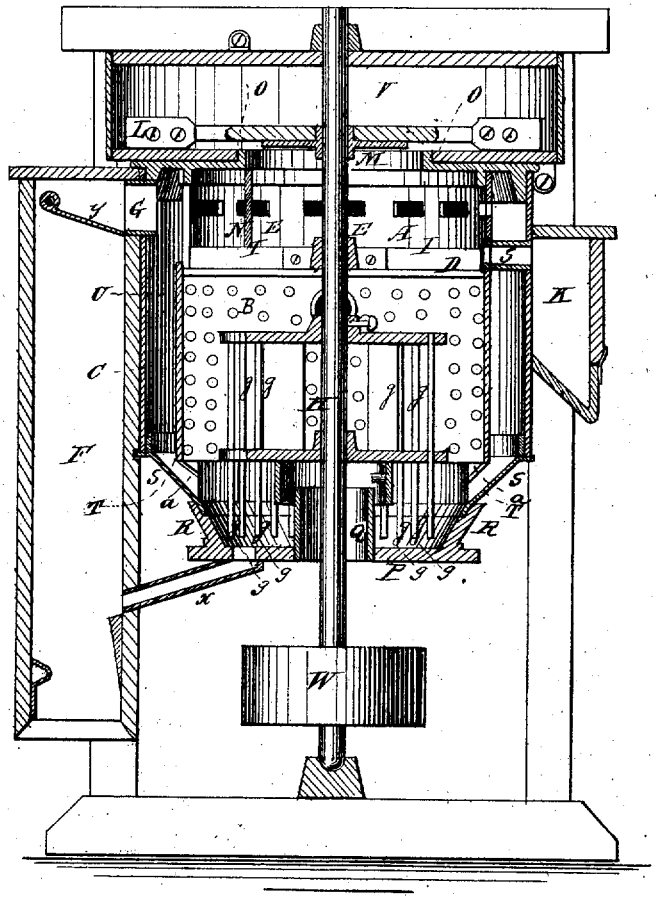
WITNESSES:
P. C. Dieterich
J. B. Baker
INVENTOR.
Herman A. Barnard
per T. H. Alexander
ATTORNEY.
AM. PHOTO-LITHOGRAPHIC Co. N. Y. (OSBORNE'S PROCESS.)

UNITED STATES PATENT OFFICE.

HEMAN A. BARNARD, OF MOLINE, ILLINOIS, ASSIGNOR TO THE BARNARD AND LEAS MANUFACTURING COMPANY.

IMPROVEMENT IN SMUT-MILLS.

Specification forming part of Letters Patent No. 144,050, dated October 28, 1873; reissue No. 5,795, dated March 17, 1874; application filed January 6, 1874.

*To all whom it may concern:*

Be it known that I, HEMAN A. BARNARD, of Moline, in the county of Rock Island and State of Illinois, have invented certain new and useful Improvements in Smut-Mills; and I do hereby declare that the following is a full, clear, and exact description thereof, references being had to the accompanying drawings and to the letters of reference marked thereon, which form a part of this specification.

This invention relates to a combined smutter and separator; and consists in the construction of the scouring-case with a flaring ring interposed between the bottom scouring-section and the main part of the case, and an opening extending entirely around the main scouring-case near the bottom, connecting the bottom of the space or chamber around the main scouring-case with the interior of the bottom scouring-section. It also consists in the arrangement of the trunk, valve, and chamber with the scraper and space, and in the form of the shield, and in the combination of parts, as hereinafter more fully described.

In order to enable others skilled in the art to which my invention appertains to make and use the same, I will now proceed to describe its construction and operation, referring to the annexed drawing, which represents a longitudinal vertical section of my machine.

B represents the scouring-case, and C the outer case or jacket, which is extended upward as high as may be desired from the top plate D of the scouring-case, to form a chamber, A. The scouring-case B may be made of any desired material, and in such a manner that an opening, T, will be formed around it and through it at or near the bottom for the admission of screenings and the discharge of air. R is a ring or section of the scouring-case B, resting on the bottom plate P, and may be perpendicular or slightly larger at the top, if desired. S is the next ring or section of the case B, and is fitted into the top of the section R. It inclines upward and outward a sufficient distance to receive and support the outer case C. At the inner and lower edge it is provided with projections *a a*, at intervals. The number of these projections is determined by the diameter of the case B; and they serve to support all the upper part of the case B above them. The case B above the projections *a a* may be made all in in one part, or in several parts, as may be desired. U represents the space between the case C and that part of the case B above the flaring ring S; and this space communicates with the interior of the scouring-case by means of the opening T formed between the main part of the case and the ring S. The space U forms a passage for the air and dust to pass outward to the chamber A. The case B is provided with openings E E near its top, extending entirely around it connecting the air-passage or space U with the said chamber A, for the air and dust to enter said chamber. F represents the separating-trunk, which is connected, by an opening, G, with the chamber A, allowing the air and screenings to enter the chamber. Y represents a hinged valve to regulate the current of air ascending the trunk F. H is the upright shaft, which extends from the top to the bottom of the machine, and has a scraper, I, fastened to it, and revolves with it. The scraper I is placed in the chamber A immediately above the top plate D of the scouring-case, and which forms the bottom or floor of the chamber A. J is an opening, through which the screenings are discharged from the chamber A into the outer screen-box R, by the revolutions of the scraper I. L represents the fan, which is fastened to the shaft H, revolves with it, and is located just above the chamber A. M is a round opening in the top plate O of the chamber A and bottom of the fan-drum V, for the passage of the air from said chamber to the fan. The fan-drum V rests on said top plate O. N is a semicircular partition or shield fitted into the opening M, and extending downward nearly to the scraper I, and is used as a shield to prevent the screenings entering the chamber A at the opening G from being drawn up into the fan through said opening M. Q is an opening in the center of the bottom plate P, for the admission of air. W is the pulley by which motion is imparted to the shaft H by the use of a belt. X is a spout, through which the wheat passes from the screening-case B to the separating-trunk F. *g* represents the beaters, which are attached to and revolve with shaft H.

These beaters extend down into the bottom scouring-section for operating upon the grain.

The machine is operated as follows: Motion being imparted to the shaft H, the fan L causes a current of air to ascend the separating-trunk F, and pass into the chamber A at the opening G. Another current enters the machine at the opening Q, and, dividing, part passes through the opening T, and part through the openings in the ventilating scouring-case B, and, uniting again in the passage U, pass up it through the openings E E into the chamber A, uniting with the current coming from the trunk F, and both, passing up through the opening M into the fan-drum V, are forced, by the fan L, out of the machine. The wheat, which enters through a spout in the side of the machine, passes down through the scouring-case B, where it is thoroughly scoured, the dust and scourings being expelled through the openings in the case B, and drawn by the ascending current of air up through the chamber A into the fan. The fine screenings, which may be driven through the ventilating-openings in the scouring-case into the space U, and are too heavy to be drawn up into the chamber A, drop down onto the ring S, slide through the opening T, back again into the interior of the scouring-case B, among the wheat. These screenings, being thus returned to or among the wheat, will pass with it, through the spout X, into the separating-trunk F, where they will be separated from the wheat, and carried by the ascending current up the trunk F, and through the opening G, into the chamber A, and thus saved with the other screenings. The screenings strike the shield N and drop onto the floor D, when they are expelled, by the revolving scraper I, out into the screen-box K, while all the dust is drawn up into the fan-drum V and blown out of doors.

Having thus fully described my invention, what I claim as new, and desire to secure by Letters Patent, is—

1. The scouring-ring R, constructed to form the lower part of the scouring-case B, in combination with bottom plate P and ring S, all arranged substantially as set forth.

2. The combination of the scouring-case B, outer case C, flaring ring S, opening T, scouring-ring R, and beaters *g*, all constructed and arranged to operate substantially as and for the purpose set forth.

3. The trunk F, valve Y, opening G, and chamber A, arranged, in relation to the space U and scraper I, substantially as and for the purpose set forth.

4. The shield N, of semicircular form, fitted in the opening M and extending downward nearly to the scraper I in the chamber A, substantially as and for the purpose specified.

5. The combination, with the chamber or screen-box A and its interior revolving scraper I, of the separating-trunk F, discharge-box K, and fan L, substantially as and for the purpose herein set forth.

In testimony that I claim the foregoing as my own I affix my signature in presence of two witnesses.

H. A. BARNARD.

Witnesses:
ALEX. F. SWANDER,
D. C. DIMOCK, Jr.